US007401041B2

(12) United States Patent
Goldfarb et al.

(10) Patent No.: US 7,401,041 B2
(45) Date of Patent: Jul. 15, 2008

(54) SYSTEMS AND METHODS FOR PROVIDING ROBUST INVESTMENT PORTFOLIOS

(75) Inventors: Donald Goldfarb, New York, NY (US); Garud Iyengar, New York, NY (US)

(73) Assignee: The Trustees of Columbia University, New York, NY (US)

( * ) Notice: Subject to any disclaimer, the term of this patent is extended or adjusted under 35 U.S.C. 154(b) by 1452 days.

(21) Appl. No.: 10/022,647

(22) Filed: Dec. 17, 2001

(65) Prior Publication Data
US 2002/0123953 A1 Sep. 5, 2002

Related U.S. Application Data

(60) Provisional application No. 60/256,150, filed on Dec. 15, 2000.

(51) Int. Cl.
  *G06Q 40/00* (2006.01)
(52) U.S. Cl. .................................................. 705/36 R
(58) Field of Classification Search ................ 705/36 R
  See application file for complete search history.

(56) References Cited

U.S. PATENT DOCUMENTS

| 5,812,987 | A | 9/1998 | Luskin et al. | 705/36 |
| 6,003,018 | A | 12/1999 | Michaud et al. | 706/36 |
| 6,078,904 | A | 6/2000 | Rebane | 705/36 |
| 6,240,399 | B1 | 5/2001 | Frank et al. | 705/36 |
| 6,275,814 | B1 | 8/2001 | Giansante et al. | 705/36 |
| 6,282,520 | B1 | 8/2001 | Schirripa | 705/36 |
| 6,292,787 | B1 | 9/2001 | Scott et al. | 705/36 |

OTHER PUBLICATIONS

Lobo, Miguel Sousa and Stephen Boyd. "The Worst-Case Risk of a Portfolio." Technical Report, pp. 1-28, Sep. 2000.*
Lobo, Miguel Sousa. "Robust and Convex Optimization With Applications in Finance." Dissertation submitted to the Department of Electrical Engineering and the Committee on Graduate Studies of Stanford University, pp. i-x, 1-104, Mar. 2000.*

* cited by examiner

*Primary Examiner*—Susanna M Diaz
(74) *Attorney, Agent, or Firm*—Baker Botts LLP (57) ABSTRACT

Robust methods for determining an investment portfolio are based on investment parameters which are assumed to be error bounded rather than precisely known values. A confidence threshold is input based on the measure of confidence in the resulting worst-case portfolio performance that is desired by an investor. Using historical return data, a nominal value for the mean return for each asset, a nominal factor loading vector for each asset and a nominal factor covariance matrix are determined. Uncertainty sets, which define the region within which a parameter is statistically expected to reside are defined for the mean return vector, factor loading matrix and factor covariance matrix. The uncertainty sets are then applied to a robust investment problem of interest, based on investment objectives, such that the worst case market parameters reside within the applied uncertainty sets with a probability set by the selected confidence threshold. Preferably, the uncertainty sets are defined in a manner which enables the robust investment problem of interest to be expressed in the form of a second-order cone problem, which is readily solvable by a number of known techniques.

38 Claims, 4 Drawing Sheets

SYSTEMS AND METHODS FOR PROVIDING ROBUST INVESTMENT PORTFOLIOS

This application claims the benefit of U.S. Provisional Application, Ser. No. 60/256,150, filed on Dec. 15, 2000, and entitled METHOD FOR ROBUST PORTFOLIO OPTIMIZATION, the disclosure of which is hereby incorporated by reference in its entirety.

FIELD OF THE INVENTION

The present invention relates generally to the selection and optimization of an investment portfolio and more particularly relates to computer based systems and methods for determining robust solutions to investment problems within a desired confidence level.

BACKGROUND OF THE INVENTION

In developing an investment portfolio, a number of assets are selected from a large group of available assets and the amount of capital to be invested is allocated among the selected assets. An objective of portfolio selection and allocation is to maximize the return on the investment with a controlled degree of risk. It is generally understood that by diversification, the expected degree of risk associated with a portfolio can be controlled.

Figure 1:
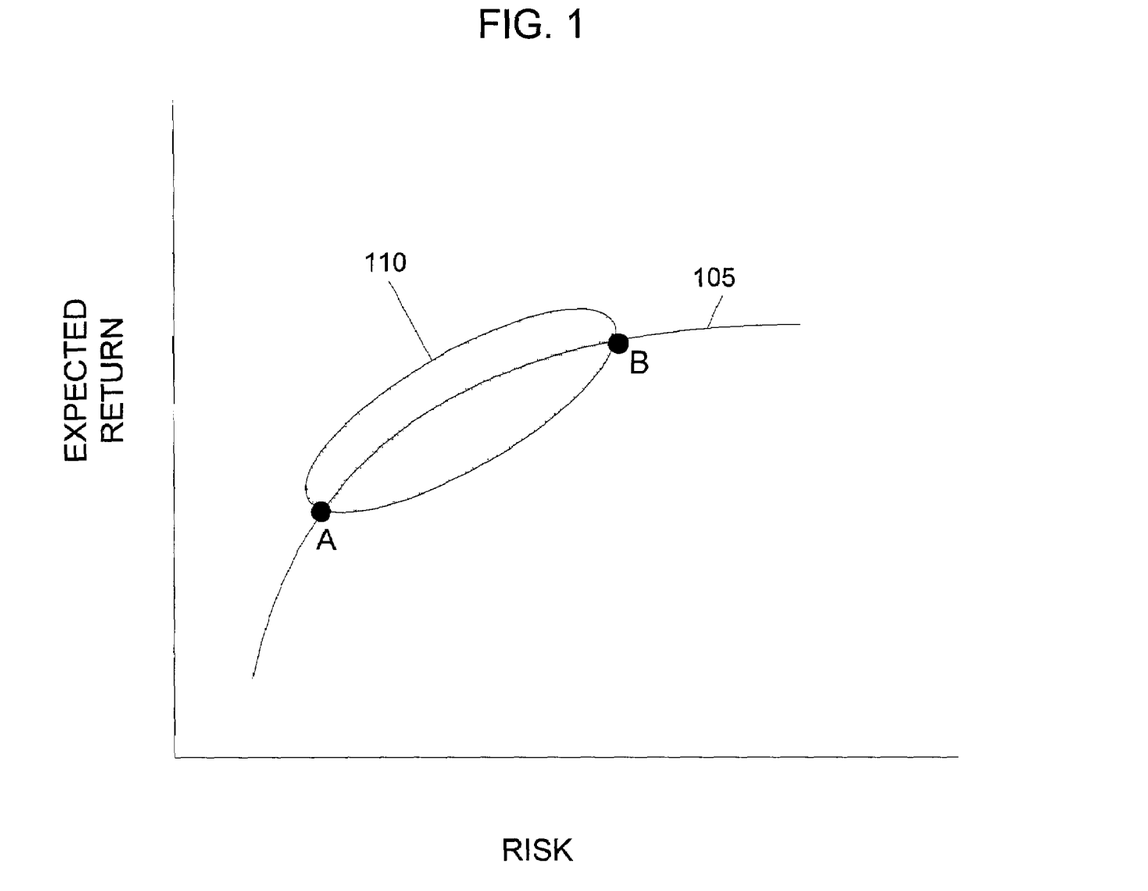
FIG. 1 is a graph of risk versus return which illustrates the prior art concept of an efficient frontier.

There are several well known mathematical modeling techniques for portfolio selection and management, such as those which employ the Markowitz portfolio selection model. The Markowitz model is a mean-variance model which shows that for a given upper bound on risk that an investor is willing to accept or a lower bound on the acceptable level of return, optimal portfolio selection can be performed by solving a quadratic optimization problem. When it is assumed that risk and return are exactly known and noise free, this relationship can be expressed graphically to define what is known as the "efficient frontier" as illustrated in FIG. 1 by line 105. An extension of the Markowitz mean-variance model is the capital asset pricing model (CAPM) developed by Sharpe et al. The import of the theoretical works of Markowitz and Sharpe were recognized in 1990, as these individuals shared the Nobel prize in Economic Science for their work on portfolio allocation and asset pricing.

Although the Markowitz mean-variance model is important theoretically, as a practical matter, many practitioners have shied away from this technique due to inherent "real world" uncertainties. For example, the solutions to the optimization problems are often sensitive to perturbations in the underlying market parameters of the problem, and since these market parameters are estimated from noisy data which are subject to statistical variations, the resulting optimizations may not be reliable. As a result, in practice, the so-called "efficient frontier" is not an error free line defining the relationship between risk and return which is exactly known, but is an unknown, error-bounded region, such as is illustrated by the shaded region 110 in FIG. 1. As set forth in U.S. Pat. No. 6,003,018 to Michaud et al., simulations can be used to estimate the error in the frontier region. However, such an approach suffers from the "curse of dimensionality" and will be rendered ineffective as the number of assets increases.

Accordingly, there remains a need for systems and methods which can efficiently provide robust portfolio allocations within a defined confidence interval.

SUMMARY OF THE INVENTION

It is an object of the present invention to provide an improved computer based system for selecting assets for a portfolio and determining an optimum asset allocation in the portfolio based on defined risk, return and confidence parameters.

It is a further object of the present invention to provide a robust investment modeling tool in which perturbations in market parameters are modeled as uncertainty sets, which are unknown yet bounded and optimization is performed assuming worst case behavior of these parameters.

It is another object of the present invention to provide robust portfolio allocation problems in the form of readily solvable, second-order cone programs (SOCP).

In accordance with the present invention, a method is provided for determining a robust investment portfolio based on investment parameters. The portfolio is based on a model for the market return vector, r, which can be expressed by the linear model:

$$r = \mu + V^T f + \epsilon$$

where $\mu$ is the mean return vector which lies in a first uncertainty set ($S_m$), V is the factor loading matrix that lies in a second uncertainty set ($S_v$), the covariance F of factor returns f lies in a third uncertainty set ($S_f$). Thus, the values are not exactly known, but will reside within the uncertainty sets with at least a specified level of statistical confidence. The residual return $\epsilon$ has an associated diagonal covariance D=diag (d) where each diagonal entry $d_i \in [\underline{d}_i, \overline{d}_i]$.

The resulting portfolio will include a number of assets with the assets having return and factor loading data associated therewith. The method includes selecting a confidence threshold for the investment results of interest. A nominal value for the mean return for each asset and a nominal factor loading vector for each asset are derived based on historical return data for the assets and factors of interest. A nominal factor covariance matrix is also determined. The uncertainty set for the vector of mean returns is defined based upon the nominal returns for each asset and the confidence threshold. The uncertainty set for the factor loading matrix is defined based upon the nominal factor loading vectors and the confidence threshold. Similarly, an uncertainty set for the factor covariance matrix is also established based on the nominal factor covariance matrix and the confidence threshold. Depending on the desired investment objective, at least one of the uncertainty sets are applied to an investment problem of interest such that the worst case market parameters reside within the applied uncertainty sets with a probability set by the selected confidence threshold.

Preferably, the uncertainty set for the mean return vector is defined such that the true mean return vector will reside within this uncertainty set with a probability determined by the confidence threshold. The uncertainty set for the factor loading matrix is preferably defined such that the true factor loading matrix will reside within this uncertainty set with a probability determined by the confidence threshold. Similarly, the uncertainty set for the factor covariance matrix is preferably defined such that the true factor covariance will reside within this uncertainty set with a probability determined by the confidence threshold.

In a preferred embodiment, the uncertainty sets take a form such that the investment problem of interest can be stated in the form of a second-order cone problem. (SOCP).

Once the uncertainty sets are determined, the investment problem of interest is selected based on the desired investment objectives. For example, if an investor has the objective of minimizing risk for an expected return, the investment problem can take the form of a robust minimum variance portfolio selection program. If the investment objective is maximizing expected return for a predetermined level of risk, the investment problem generally takes the form of a robust maximum return portfolio selection program. In the case where the desired investment objective is maximizing the worst case ratio of the expected excess return to the standard deviation of the asset return, the investment problem takes the form of a robust maximum Sharpe ratio portfolio selection program. Another viable investment objective is to limit the probabilities of various levels of shortfall, in which case the investment problem can take the form of a robust value at risk portfolio selection program. Each of these "robust" investment problems have analogs in conventional portfolio management methods. However, by applying the confidence factor driven uncertainty sets to such problems, an investor can define a portfolio with a statistical level of confidence that the worst case performance will meet or exceed expectations.

The computer-based methods are generally embodied in computer software which resides on computer readable media, such as solid state storage devices (ROM), magnetic storage devices (hard disk and floppy disk media), optical storage devices (CD-ROM) and the like.

Also in accordance with the present invention is a computer-based system for determining an investment portfolio based on investment parameters. The portfolio generally includes a number of assets which have return and factor loading data associated therewith. The system includes an input device, an output device (such as a display device), computer readable storage including program storage and a database of historical return data, and a processor operatively coupled to the input device, display device and computer readable storage.

The processor receives a program from the computer readable storage and operates in accordance with the program to: receive a confidence threshold for the investment parameters received from the input device; read historical return data for a number of assets and factors from the computer readable storage; determine a nominal value for the mean return for each asset from at least a portion of the historical return data; determine a nominal factor loading vector for each asset from at least a portion of the historical return data; determine a nominal factor covariance matrix; define the uncertainty set for the mean return vector based upon the nominal returns for each asset and the confidence threshold; define the uncertainty set for the factor loading matrix based upon the nominal factor loading vectors and the confidence threshold; define the uncertainty set for the factor covariance matrix based on the nominal factor covariance matrix and the confidence threshold; and based upon a desired investment objective provided by a user via the input via the input device, apply at least one of the uncertainty sets to an investment problem program module of interest such that the worst case market parameters reside within the applied uncertainty sets with a probability established by the selected confidence threshold.

The computer based system can be configured to perform portfolio selection based on a variety of criteria and objectives. Preferably, the system has modules for performing a robust minimum variance portfolio selection program, a robust maximum return portfolio selection program, a robust maximum Sharpe ratio portfolio selection program and a robust value at risk portfolio selection program.

BRIEF DESCRIPTION OF THE DRAWING

Further objects, features and advantages of the invention will become apparent from the following detailed description taken in conjunction with the accompanying figures showing illustrative embodiments of the invention, in which.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

The present invention applies robust modeling techniques to investment problems in order to reduce the sensitivity to market parameter perturbations which undermine the usefulness of prior art systems, such as the Markowitz mean-variance modeling technique. In robust modeling, for a suitably defined uncertainty set, linear programs, quadratic programs and general convex programs have robust counterparts which take the form of tractable optimization problems. Thus, problems which previously could not readily be solved, can now be solved in a relatively efficient manner.

An investment market can be defined as a collection assets which are traded in an open exchange and can be characterized, inter alia, by a random asset return and an associated risk. The return and risk associated with the asset can be characterized by numerous factors which affect the individual asset as well as the market as a whole. Examples of such assets include stocks, bonds, commodities and the like. The term portfolio is used herein in its conventional sense as one or more assets over which a sum of capital to be invested is distributed or allocated.

Robust Factor Model

A given asset can be defined in terms of a market return vector, r, which can be expressed by the linear model:

$$r = \mu + V^T f + \in$$

where $\mu$ is the mean return vector, V is the factor loading matrix, f is the vector of factor returns and $\in$ represents the residual return. It is assumed that the residual return $\in$ is independent of the factor returns f that drive the market. Unlike the Markowitz model, this definition of a market return vector does not assume that $\mu$ and V are known. To the contrary, in the present invention $\mu$ and V are defined in terms of corresponding uncertainty sets, $S_m$ and $S_v$, respectively, which are statistically definable.

The concept of uncertainty sets is known in other forms of robust modeling and is used herein to describe ranges of values in which various parameters, which are unknown yet bounded, are statistically expected to reside. A number of uncertainty sets will be used throughout this description. For example, $S_m$ represents the set, or range of values, in which the "real" value of the mean return vector $\mu$ resides; $S_v$ represents the uncertainty set in which the "real" value of the factor loading matrix V resides; and $S_f$ (or its inverse, $S_f^{-1}$) represents the set in which the covariance F of the factor returns f resides.

The covariance of the residual returns can be represented by a matrix D, that can be expressed as D=diag(d) which is a positive diagonal matrix with $d_i > 0$. Each diagonal entry of this matrix, $d_1$, is not known precisely but is bounded by the range $d_i \in [\underline{d}_i, \overline{d}_i]$. Thus, an uncertainty set for the matrix D can be expressed as:

$$S_d = \{D: D = \text{diag}(d), d_i \in [\underline{d}_i, \overline{d}_i]\}$$

and represents the uncertainty set in which the covariance of the residual returns resides.

Figure 2:
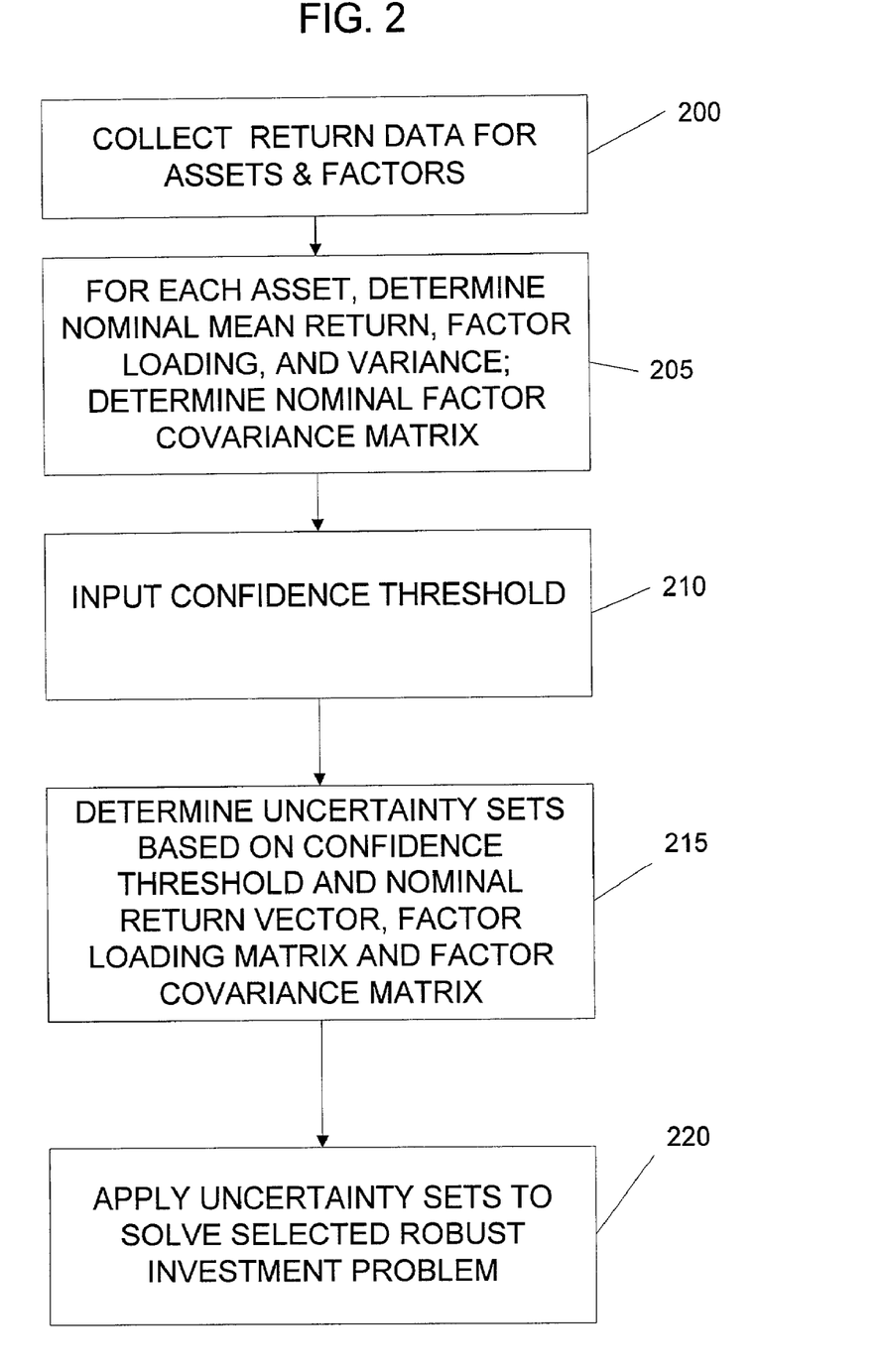
FIG. 2 is a simplified flow chart illustrating an overview of the present robust methods for solving investment problems.

Referring to FIG. 2, given the market return vector r, set forth above, and the definitions for the uncertainty sets set forth above, return data for the assets and market factors are used to define the uncertainty sets $S_m$, $S_v$ and $S_f$ as well as the bounds $[\underline{d}_i, \overline{d}_i]$. The portfolio includes n assets which have returns, r, effected by m factors over p investment periods. The investment period can be defined in any convenient temporal span such as days, weeks, months, fiscal quarters and the like. The specific factors which are used can be selected from a variety of well known economic indicators, such as major stock market indices (Dow Jones Composite Average, Nasdaq 100, S & P 500, Transportation index, Energy index and the like), bond rates (treasury rate), consumer confidence data and the like.

In addition to the commonly available economic factors, additional factors can be derived based on covariance matrices determined for different assets. For example, given historical asset return data, a set of eigenvectors corresponding to a number of the largest eigenvalues of the covariance matrix of asset returns can be derived and used as a portion of the m factors. The number and type of factors selected is broad and not intended to be limited to the specific examples set forth herein.

In step 200, return data for the n assets and m factors are collected. Although this is shown as a discrete step, it will be understood that the collection and storage of a database of asset and factor return data is a substantially continuous process which takes place independently of the other operations of the methods set forth herein.

For each of the n assets selected, the nominal return, $\mu_0$ and nominal factor loading matrix $V_0$ and the nominal factor covariance matrix $F_0$ will be determined (step 205). The nominal values $\mu_0$, $V_0$ and $F_0$ essentially define the midpoint of the uncertainty sets $S_m$, $S_v$, and $S_f$, respectively. These values can be determined using least squares estimates of the mean return $\mu$ and the factor loading matrix V. This can be expressed mathematically as follows:

For each asset $i=1, \ldots, n$, define $\mu_i^0 \in R$ and $V_i^0 \in R^m$ as follows:

$$x^i = \begin{bmatrix} \mu_i^0 \\ V_i^0 \end{bmatrix} = (A^T A)^{-1} y^i, \text{ where}$$

-continued $$A = [1 \ B] = \begin{bmatrix} 1 & f_1^1 & f_2^1 & \cdots & f_m^1 \\ 1 & f_1^2 & f_2^2 & \cdots & f_m^2 \\ \vdots & \vdots & \vdots & \vdots & \vdots \\ 1 & f_1^p & f_2^p & f & f_m^p \end{bmatrix}, y^i = \begin{bmatrix} r_i^1 \\ r_i^2 \\ \vdots \\ r_i^p \end{bmatrix},$$

i.e. $y^i$ is the vector of the returns of the asset i over the p market periods. For each residual return $\epsilon_i, i=1, \ldots n$, define the sample variance $$s_i^2 = \frac{\|y^i - Ax^i\|^2}{p - m - 1}.$$

The sample variance, $s_i^2$, represents the nominal value for the range of $d_i$.

Based on investor preferences, a confidence threshold $\omega$ is selected (step 210). Whereas the nominal values establish the approximate center of the uncertainty sets, the confidence factor operates to establish the breadth of the uncertainty sets. The confidence threshold is user selected and has a value which is in the range (0,1) and more typically in the range of about $0.80 < \omega < 0.97$. As a general rule, when a higher confidence threshold value is selected, a more conservative portfolio will result.

In step 215, the uncertainty sets $S_m$, $S_v$, and $S_f$ as well as the range $[\underline{d}_i, \overline{d}_i]$ for the uncertainty set $S_d$, will be determined. In one embodiment, the range $[\underline{d}_i, \overline{d}_i]$ can be determined using a bootstrapping technique, described for example in "An Introduction to Bootstrap," by B. Efron and R. Tibshirani, Number 57 in Monographs on statistics and applied probability, published by Chapman & Hall, 1993, which is hereby incorporated by reference in its entirety, to determine a confidence interval around the nominal sample variance $s_i^2$. Alternatively, since only an estimate of the worst case error variance is required, any suitable bounds on $s_i^2$ can be used for those cases where it is more advantageous to eliminate the computational expense associated with the bootstrapping technique.

The uncertainty sets $S_m$ and $S_v$ are selected such that the "true" mean return vector $\mu$ and the "true" factor loading matrix V lie in their respective uncertainty sets with a probability of at least $\omega^n$. This can be expressed as follows:

Let $c_m(\omega)$ be the $\omega$-critical value of an F-distribution with m+1 degrees-of-freedom in the numerator and p−m−1 degrees-of-freedom in the denominator, i.e., $c_m(\omega)$ solves the equation $$\Im_F(c_m(\omega)) = \omega,$$

where $\Im_F$ denotes the cumulative density function of the F-distribution.

Define the empirical covariance matrix $$F_{ml} = \frac{1}{p-1}\left(B^T B - \frac{1}{p} B^T 11^T B\right)$$

and set $$G = (p-1)F_{ml}^{-1}.$$

For each asset i, define the bounds $$\gamma_i = \sqrt{(m+1)s_i^2(A^T A)_{11}^{-1} c_m(\omega)} \quad \rho_i = \sqrt{(m+1)c_m(\omega)s_i^2}.$$

Set $$S_m = \{\mu : \mu = \mu_0 + \nu, |\nu_i| \leq \gamma_i\},$$

and $$S_v = \{V : V = V_0 + W_i, \|W_i\|_g \leq \rho_i\},$$

where $W_i$ is the i-th column of W matrix and $\|w\|_g = \sqrt{w^T G w}$.

This choice of $S_m$ and $S_v$ guarantees that the "true" mean return vector $\mu$ and "true factor loading matrix V lie in their respective uncertainty sets with probability at least $\omega^n$.

The "true" covariance matrix F should lie in the set $S_f$ with a probability of $\omega^m$. To satisfy this constraint, the following relationships can be employed:

Let $\Gamma_p$ denote a Gamma random variable with scale parameter $$\beta = \frac{2}{p-1}$$

and the shape parameter $$\alpha = \frac{p+1}{2}$$

with the corresponding density given by $$f_{\Gamma_p}(x) = \begin{cases} \frac{1}{\beta^\alpha \Gamma(\alpha)} x^{\alpha-1} e^{-\frac{x}{\beta}} & x \geq 0, \\ 0 & \text{otherwise}. \end{cases}$$

Let $F_{\Gamma_p}$ denote the corresponding cumulative density function. Define $\eta$ to be the solution of the nonlinear equation $$F_{\Gamma_p}(1+\eta) - F_{\Gamma_p}(1-\eta) = \omega.$$

and let $$S_f = \left\{ F : F^{-1} = F_{ml}^{-1} + \Delta, \left\| F_{ml}^{\frac{1}{2}} \Delta F_{ml}^{\frac{1}{2}} \right\| \leq \eta \right\}$$

This choice ensures that the "true" covariance matrix F lies in the set $S_f$ with probability $\omega^m$.

Using the definition of the market return vector r set forth above and having determined the uncertainty sets $S_m$, $S_v$, $S_f$, and the interval $[\underline{d}_i, \overline{d}_i]$ of $S_d$ based on the confidence threshold, $\omega$, these uncertainty sets can be applied to a number of investment problems of interest (step 220).

Figure 3:
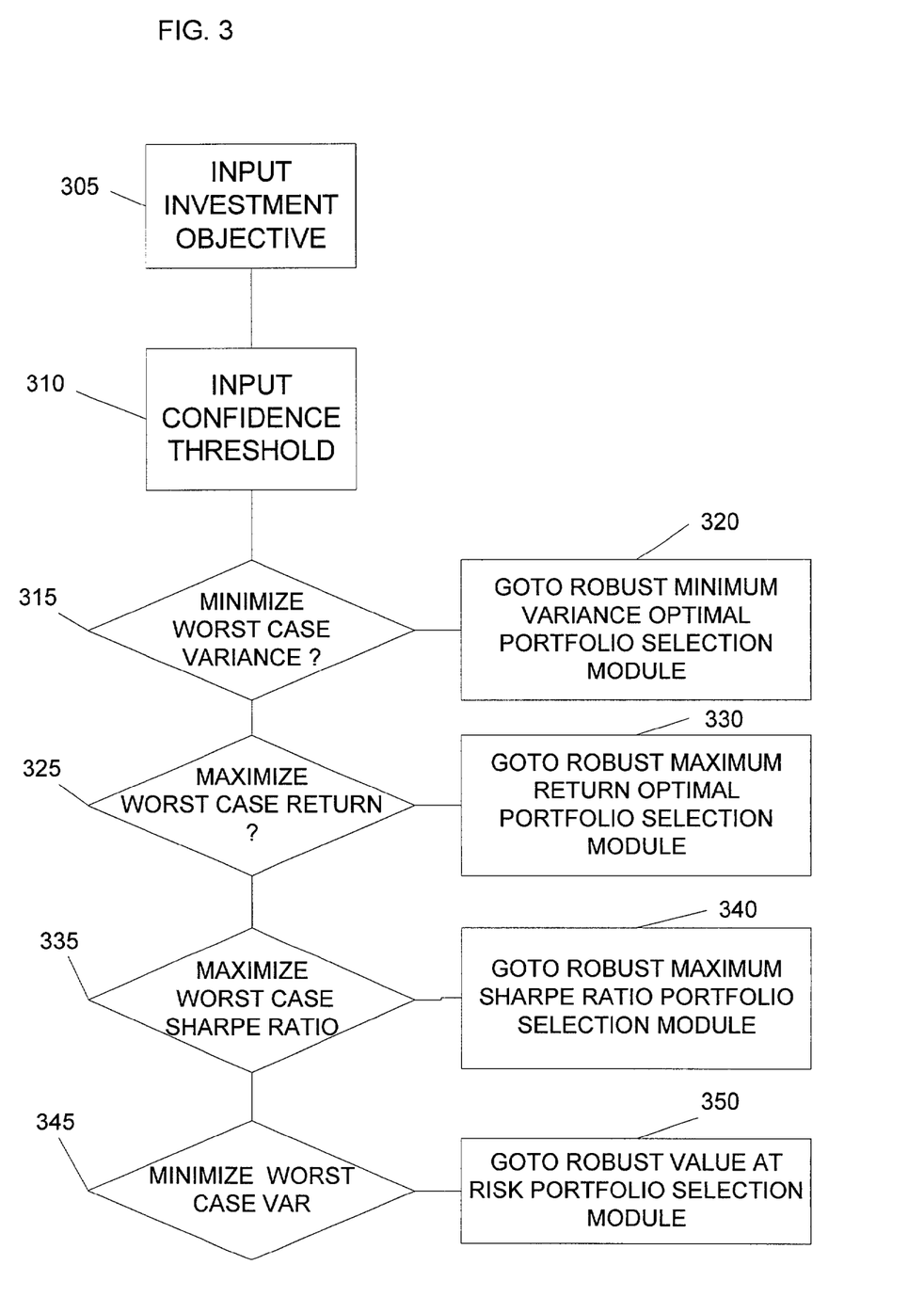
FIG. 3 is a simplified flow chart further illustrating the selection of one of a variety of robust portfolio selection modules in accordance with investment objectives.

Referring to FIG. 3, a typical computer-based system may query the user regarding investment objectives as well as risk tolerance or aversion (step 305). The system would also query the user regarding the confidence level within which such objectives should be achieved (step 310). A series of menu choices can then be provided to determine the most appropriate portfolio selection technique for a particular investor. For example, if the objectives indicate a desire to minimize worst case variance (step 315), a robust mean-variance optimal portfolio selection module can be invoked (step 320). Similarly, if the investor wishes to maximize worst case returns for a desired level of risk (step 325), a robust maximum return optimization module can be invoked (step 330). In addition, robust maximum Sharpe ratio portfolio selection (steps 335, 340), or robust value at risk portfolio selection modules (steps 345, 350) can be invoked if desired.

Robust Minimum Variance Optimal Portfolio Selection Module

The robust minimum variance optimal portfolio selection module can be viewed as a robust analog to the Markowitz mean-variance optimization problem. The objective of the robust minimum variance optimal portfolio selection program is to select and allocate funds to a group of assets from the universe of available assets such that the worst case variance of the resulting portfolio is minimized subject to the constraint that that worst case expected return on the portfolio exceeds a prescribed threshold, $\alpha$, within a statistical probability determined by the confidence factor input by the investor.

The robust minimum variance problem is mathematically stated as:

minimize max $_{\{V \in S_v, F \in S_f, D \in S_d\}}$ Var $[r^T \phi]$ subject to min $\{\mu \in S_m\}$ E$[r^T \phi] \geq \alpha$, $1^T \phi = 1$ For the uncertainty sets defined above for $S_v$, $S_f$, $S_d$ and $S_m$, this problem can be expressed as a second-order cone problem which can be readily solved using known techniques, such as through the use of an interior point algorithm, as described by Lobo et al. in "Applications of Second-Order Cone Programming", Linear Algebra Appl., 284(1-3): 193-228, 1998, which is hereby incorporated by reference.

The following will illustrate the process of expressing the investment problems into the desired SOCP form. Initially, the constraints of the various investment problems are set forth as a collection of linear equalities, linear inequalities and restricted hyperbolic constraints (i.e. constraints of the form:

$z^T z \leq xy$, $z \in R^n$, $x, y \in R$ and $x, y \geq 0$.) as follows:

Let $r, v > 0$, $y_0, y \in R^m$ and $F, G \in R^{m \times m}$ positive definite matrices.

Then the constraint $$\max_{\{y : \|y\|_g \leq r\}} \|y_0 + y\|_f^2 \leq v$$

is equivalent to either of the following:
(i) there exist $\tau, \sigma \geq 0$, and $t, w \in R^m$ that satisfy $$w = Q^T H^{\frac{1}{2}} G^{\frac{1}{2}} y_0,$$

$$v \geq \tau + 1^T t$$

$$\sigma \leq \frac{1}{\lambda_{\max}(H)},$$

$$r^2 \leq \sigma \tau,$$

$$w_i^2 \leq (1 - \sigma \lambda_i) t_i, \ i = 1, \ldots, m,$$

where $$H = G^{-\frac{1}{2}} F G^{-\frac{1}{2}}, H = Q\Lambda Q^T$$

is the spectral decomposition of H, and $\Lambda=\text{diag}(\lambda_i)$.

(ii) there exist $\tau,\sigma \geq 0$, and $s,w \in R^m$ that satisfy $$\begin{aligned}
u &= P^T F^{\frac{1}{2}} y_0, \\
r^2 &\leq \tau(v - 1^T s), \\
u_i^2 &\leq (1 - \tau\sigma_i) s_i, \quad i=1,\ldots,m, \\
\tau &\leq \frac{1}{\lambda_{\max}(\kappa)},
\end{aligned} \quad (23)$$

where $$K = F^{-\frac{1}{2}} G^{-1} F^{\frac{1}{2}}, K = P\Theta P^T$$

is the spectral decomposition of K, and $\Theta=\text{diag}(\theta_i)$.

The following definition is then used in connection with a mathematical transform to convert the robust minimum variance problem into the form of a second-order cone problem (SOCP) in accordance with the constraints set forth above. This transformation starts with the following definition:

Definition 1 Given $V_0 \in R^{m \times n}$, and $F,G \in R^{m \times m}$, define $H(V_0,F,G)$ to be the set of all vectors $(r;v;\delta;\phi) \in R \times R \times R \times R^n$ such that $r,v,y_0=V_0(\phi)$ satisfy the set of constraints (i) or (ii) set forth above, i.e. there exist $\sigma, \tau \geq 0$ and $t \in R^m$ that satisfy $$\tau + 1^T t \leq v,$$

$$\sigma \leq \frac{1}{\lambda_{\max}(H)},$$

$$\left\| \begin{bmatrix} 2r \\ \sigma - \tau \end{bmatrix} \right\| \leq \sigma + \tau,$$

$$\left\| \begin{bmatrix} 2w_i \\ 1 - \sigma\lambda_i - t_i \end{bmatrix} \right\| \leq 1 - \sigma\lambda_i + t_i, \quad i=1,\ldots,m,$$

where $$H = G^{-\frac{1}{2}} F G^{\frac{1}{2}}, H = Q\Lambda Q^T$$

is the spectral decomposition of H, $\Lambda=\text{diag}(\lambda_i)$ and $$w = Q^T H \frac{1}{2} G \frac{1}{2} V_0 \phi;$$

and $\phi^T \overline{D} \phi \leq \delta$, or equivalently $$\left\| \begin{bmatrix} 2\overline{D}^{\frac{1}{2}} \phi \\ 1 - \delta \end{bmatrix} \right\| \leq 1 + \delta.$$

The robust minimum variance portfolio selection problem can be reformulated as $$\begin{aligned}
\text{minimize} \quad & v + \delta, \\
\text{subject to} \quad & \mu_0^T \phi - \gamma^T |\phi| \geq a, \\
& \rho^T |\phi| \leq r, \\
& 1^T \phi = 1, \\
& (r; (1-\eta)v; \delta; \phi) \in H(V_0, F_0, G).
\end{aligned}$$

This set of constraints defines a convex optimization problem, but is not yet in the form of a second-order cone problem (SOCP). By substituting a new variable $\psi$ for $|\phi|$ and adding the 2n linear constraints, $\psi_i \geq |\phi_i|, i=1,\ldots,n$, the above expression is transformed into the following SOCP formulation of the robust minimum variance portfolio selection problem.

minimize $v+\delta$, subject to $\mu_0^T \phi - \gamma^T \phi \geq \alpha$, $r \geq \rho^T \phi$, $\phi_i \geq \phi_i, i=1,\ldots,n$, $\phi_i \geq -\phi_i, i=1,\ldots,n$, $1^T \phi = 1$, $(r;(1-\eta)v;\delta;\phi) \in H(V_0,F_0,G)$.

Once the investment problem is stated in this form, it can be solved using well known techniques for solving second order cone programs, such as interior point algorithms.

Robust Maximum Return Portfolio Selection Module

The dual of the minimum variance optimization problem is that of selecting a portfolio of assets which maximizes the worst case expected return subject to a constraint on the worst case variance. This can be stated as a min-max problem:

maximize min $\{\mu \in S_m\}$ $E[r^T \phi]$ subject to max $_{\{V \in S_v, F \in S_f, D \in S_d\}}$ Var $[r^T \phi] \leq \lambda$, $1^T \phi = 1$ Based on the uncertainty sets defined above for $S_v$, $S_d$, $S_f$ and $S_m$, Definition 1 set forth above and the mathematical transforms demonstrated with respect to the robust minimum variance optimal selection problem can be applied to express this investment problem in the form of an SOCP which can be readily solved using known techniques.

Robust Maximum Sharpe Ratio Portfolio Selection Module

The objective of the robust maximum Sharpe ratio Portfolio selection program is to select a portfolio that maximizes the worst case ratio of the expected excess return to the standard deviation of the return. The expected excess return is the return of the asset in excess of the risk-free rate $r_f$. This can be expressed as a robust model in terms of the uncertainty sets defined above as follows:

$$\text{maximize}\{\phi : 1^T\phi = 1\} \min_{\{\mu \in Sm, V \in Sv, F \in Sf, D \in Sd\}} \left\{ \frac{E[r^T\phi] - rf}{\sqrt{\text{Var}[r^T\phi]}} \right\}$$

Given the appropriate definition of the uncertainty sets and Definition 1 set forth above, the robust maximum Sharpe ratio problem set forth above can be transformed into a readily solvable SOCP.

Robust Value at Risk Portfolio Selection Module

Another investment problem well suited for the present robust techniques is portfolio selection with value at risk (VaR) constraints. In this form of problem, the objective is to select a portfolio which maximizes the worst case expected return of the portfolio subject to the constraint that the probability that the return $r_\phi$ is less than a prescribed threshold $\alpha$ is below a predetermined limit. Alternatively, this can be expressed mathematically as:

maximize min $\{\mu \in S_m\}$ $E[r^T\phi]$ subject to max $_{\{V \in S_v,\ \mu \in S_m,\ F \in Sf,\ D \in Sd\}}$ $P(r^T\phi \leq \alpha) \leq \beta$, Applying the principles set forth above, this form of the problem, or one in which several VaR constraints are imposed, can be transformed into the form of an SOCP.

Figure 4:
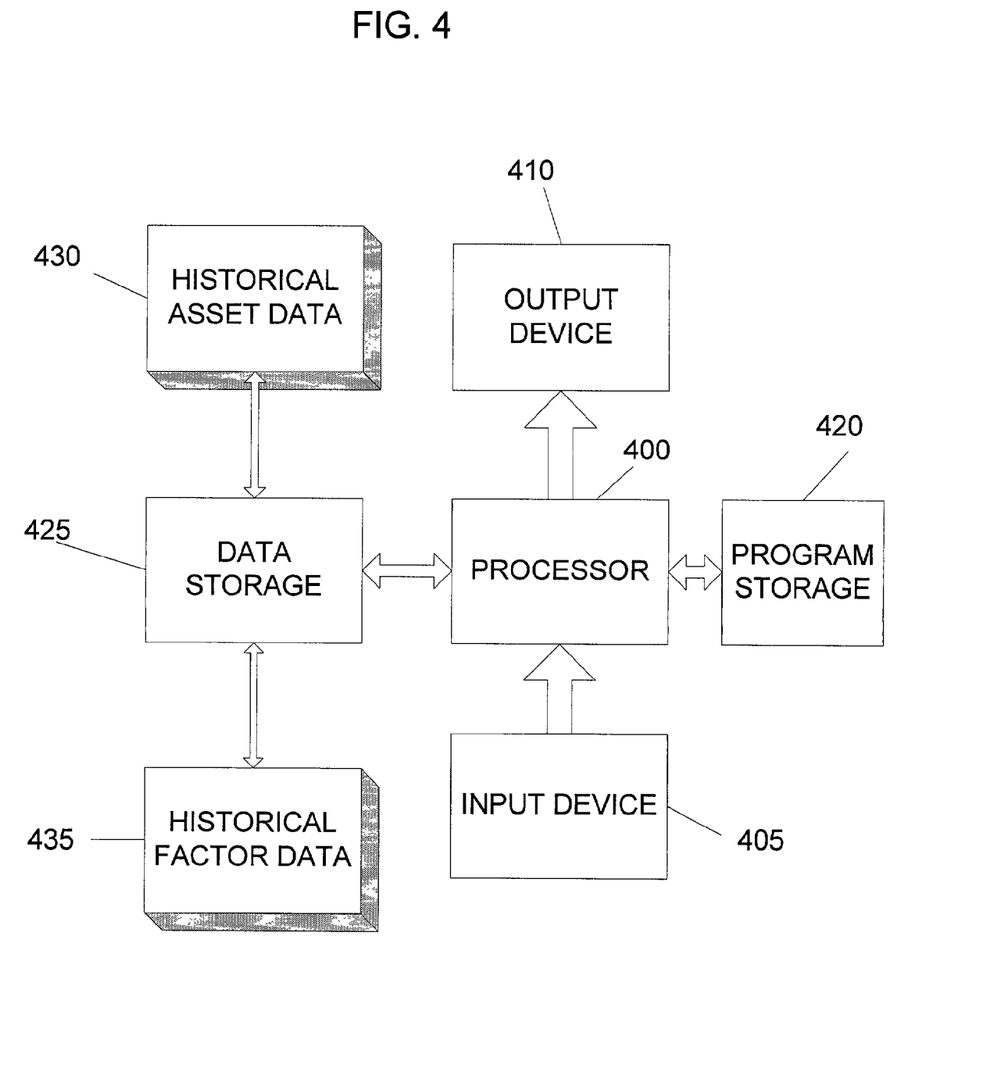
FIG. 4 is a simplified block diagram illustrating a computer based system for performing portfolio selection and analysis in accordance with the present invention.

The methods described herein are generally intended to be implemented as software operable on conventional computer-based systems, such as illustrated in FIG. 4. As is well known in the art, such computer software generally resides and is transported on computer readable media such as magnetic hard drives, floppy disks, optical CD ROMs and the like. The computer system generally includes a processor 400 which is operatively coupled to an input device 405, such as a computer keyboard, digital pointer and the like and an output device 410, such as a conventional computer monitor. The computer-based system 400 will generally include computer readable media, such as memory or read only storage devices for program storage 420 and data storage 425. The data storage 425 will generally store one or more databases of historical asset data 430 and historical factor data 435 for the assets and factors of interest.

A computer system in accordance with the present invention can be implemented on a conventional personal computer, such as an IBM compatible personal computer having a Pentium processor with a clock speed greater than 300 MHZ and suitable memory, I/O devices and the like to enable data entry and display. Of course more powerful computer systems, such as those with faster processors or those which are networked in order to share computer resources can also be used in connection with the present computer based systems and methods to enhance the speed of the calculations and provide for improved performance for more complex portfolio selection problems. Generally, the design of suitable computer systems is well known in the art.

The present systems and methods provide for investment portfolio selection which acknowledges that the underlying markets are more properly defined by uncertainty sets rather than precise numerical values. The uncertainty sets represent ranges of values that can be determined with statistical confidence levels. An investor can now apply a confidence factor to the investment problem of interest such that the resulting portfolio will deliver expected performance with a degree of statistical confidence.

Although the present invention has been described in connection with specific exemplary embodiments, it should be understood that various changes, substitutions and alterations can be made to the disclosed embodiments without departing from the spirit and scope of the invention as set forth in the appended claims.

What is claimed is:

1. A computer-based method for determining an investment portfolio based on investment parameters, the portfolio including a number of assets, the assets having return and factor loading data associated therewith, the method comprising the following computer-executed steps:

selecting a confidence threshold for the investment parameters;

determining a nominal value for the mean return for each asset;

determining a nominal factor loading vector for each asset;

determining a nominal factor covariance matrix;

defining the uncertainty set for the mean return vector based upon the nominal returns for each asset and the confidence threshold;

defining the uncertainty set for the factor loading matrix based upon the nominal factor loading vectors and the confidence threshold;

defining the uncertainty set for the factor covariance matrix based on the nominal factor covariance matrix and the confidence threshold; and based upon a desired investment objective, applying at least one of said uncertainty sets to an investment problem of interest to determine a market return vector such that the worst case market parameters reside within the applied uncertainty sets with a probability set by the selected confidence threshold, wherein said investment portfolio is created based on said market return vector.

2. The computer-based method for determining an investment portfolio of claim 1, wherein the uncertainty set for the mean return vector is defined such that the true mean return vector will reside within said uncertainty set with a probability determined by the confidence threshold.

3. The computer-based method for determining an investment portfolio of claim 1, wherein the uncertainty set for the factor covariance matrix is defined such that the true factor covariance matrix will reside within said uncertainty set with a probability determined by the confidence threshold.

4. The computer-based method for determining an investment portfolio of claim 1, wherein the uncertainty set for the factor loading matrix is defined such that the true factor loading matrix will reside within said uncertainty set with a probability determined by the confidence threshold.

5. The computer-based method for determining an investment portfolio of claim 1, wherein each uncertainty set is defined such that the true value of the parameter associated with the uncertainty set resides within the uncertainty set with a probability determined by the confidence threshold.

6. The computer-based method for determining an investment portfolio of claim 5, wherein the investment problem of interest is selected from the group consisting of a robust minimum variance portfolio selection program, a robust maximum return portfolio selection program, a robust maximum Sharpe ratio portfolio selection program and a robust value at risk portfolio selection program.

7. The computer-based method for determining an investment portfolio of claim 6, wherein the uncertainty sets take a form such that the selected investment problem of interest is solved by a second-order cone program.

8. The computer-based method for determining an investment portfolio of claim 1, wherein the uncertainty sets take a form such that the investment problem of interest can be solved by a second-order cone program.

9. The computer-based method for determining an investment portfolio of claim 1, wherein the desired investment objective is minimizing risk for an expected return and wherein the investment problem takes the form of a robust minimum variance portfolio selection program.

10. The computer-based method for determining an investment portfolio of claim 1, wherein the desired investment objective is maximizing expected return for a predetermined level of risk and wherein the investment problem takes the form of a robust maximum return portfolio selection program.

11. The computer-based method for determining an investment portfolio of claim 1, wherein the desired investment objective is maximizing the worst case ratio of the expected excess return to the standard deviation of the asset return and wherein the investment problem takes the form of a robust maximum Sharpe ratio portfolio selection program.

12. The computer-based method for determining an investment portfolio of claim 1, wherein the investment problem takes the form of a robust value at risk portfolio selection program.

13. A computer-based system for determining an investment portfolio based on investment parameters, the portfolio including a number of assets, the assets having return and factor loading data associated therewith, the system comprising:
    an input device;
    a display device;
    computer readable storage, the computer readable storage including program storage and a database of historical return data;
    and a processor operatively coupled to the input device, display device and computer readable storage, the processor receiving a program from the computer readable storage and being programmed to operate as follows:
    receiving a confidence threshold for the investment parameters received from the input device; reading historical return data for a plurality of assets and factors from the computer readable storage;
    determining a nominal value for the mean return for each asset from at least a portion of the historical return data; determining a nominal factor loading vector for each asset from at least a portion of the historical return data; determining a nominal factor covariance matrix;
    defining the uncertainty set for the mean return vector based upon the nominal returns for each asset and the confidence threshold;
    defining the uncertainty set for the factor loading matrix based upon the nominal factor loading vectors and the confidence threshold;
    defining the uncertainty set for the factor covariance matrix based on the nominal factor covariance matrix and the confidence threshold;
    and based upon a desired investment objective, applying at least one of said uncertainty sets to an investment problem of interest to determine a market return vector such that the worst case market parameters reside within the applied uncertainty sets with a probability set by the selected confidence threshold, wherein said investment portfolio is created based on said market return vector.

14. The computer-based system for determining an investment portfolio of claim 13, wherein the uncertainty set for the mean return vector is defined such that the true mean return vector will reside within said uncertainty set with a probability determined by the confidence threshold.

15. The computer-based system for determining an investment portfolio of claim 13, wherein the uncertainty set for the factor covariance matrix is defined such that the true factor covariance matrix will reside within said uncertainty set with a probability determined by the confidence threshold.

16. The computer-based system for determining an investment portfolio of claim 13, wherein the uncertainty set for the factor loading matrix is defined such that the true factor loading matrix will reside within said uncertainty set with a probability determined by the confidence threshold.

17. The computer-based system for determining an investment portfolio of claim 13, wherein the uncertainty sets take a form such that the investment problem of interest can be stated in the form of a second-order cone problem.

18. The computer-based system for determining an investment portfolio of claim 13, wherein the desired investment objective is minimizing risk for an expected return and wherein the processor operates a robust minimum variance portfolio selection program module.

19. The computer-based system for determining an investment portfolio of claim 13, wherein the desired investment objective is maximizing expected return for a predetermined level of risk and wherein the processor operates a robust maximum return portfolio selection program module.

20. The computer-based system for determining an investment portfolio of claim 13, wherein the desired investment objective is maximizing the worst case ratio of the expected excess return to the standard deviation of the asset return and wherein the processor operates a robust maximum Sharpe ratio portfolio selection program module.

21. The computer-based system for determining an investment portfolio of claim 13, wherein the processor operates a robust value at risk portfolio selection program module.

22. Computer readable media storing programmed instructions defining a computer program for a processor, the computer program determining an investment portfolio based on investment parameters, the portfolio including a number of assets, the assets having return and factor loading data associated therewith, the computer program directing the processor to perform operations comprising:
    receiving a confidence threshold for the investment parameters;
    determining a nominal value for the mean return for each asset;
    determining a nominal factor loading vector for each asset;
    determining a nominal factor covariance matrix;
    defining the uncertainty set for the mean return vector based upon the nominal returns for each asset and the confidence threshold;
    defining the uncertainty set for the factor loading matrix based upon the nominal factor loading vectors and the confidence threshold;
    defining the uncertainty set for the factor covariance matrix based on the nominal factor covariance matrix and the confidence threshold;
    and based upon a desired investment objective, applying at least one of said uncertainty sets to an investment problem of interest to determine a market return vector such that the worst case market parameters reside within the applied uncertainty sets with a probability set by the selected confidence threshold, wherein said investment portfolio is created based on said market return vector.

23. The computer readable media of claim 22, wherein the uncertainty set for the mean return vector is defined such that the true mean return vector will reside within said uncertainty set with a probability determined by the confidence threshold.

24. The computer readable media of claim 22, wherein the uncertainty set for the factor covariance matrix is defined such that the true factor covariance matrix will reside within said uncertainty set with a probability determined by the confidence threshold.

25. The computer readable media of claim 22, wherein the uncertainty set for the factor loading matrix is defined such that the true factor loading matrix will reside within said uncertainty set with a probability determined by the confidence threshold.

26. The computer readable media of claim 22, wherein each uncertainty set is defined such that the true value of the corresponding parameter will reside within said uncertainty set with a probability determined by the confidence threshold.

27. The computer readable media of claim 26, wherein the uncertainty sets take a form such that the investment problem of interest can be stated in the form of a second-order cone problem.

28. The computer readable media of claim 22, wherein the uncertainty sets take a form such that the investment problem of interest can be stated in the form of a second-order cone problem.

29. The computer readable media of claim 22, wherein the desired investment objective is minimizing risk for an expected return and wherein the investment problem takes the form of a robust minimum variance portfolio selection program.

30. The computer readable media of claim 29, wherein the robust minimum variance portfolio selection program is solved using a second order cone program.

31. The computer readable media of claim 22, wherein the desired investment objective is maximizing expected return for a predetermined level of risk and wherein the investment problem takes the form of a robust maximum return portfolio selection program.

32. The computer readable media of claim 31, wherein the robust maximum return portfolio selection program is solved using a second order cone program.

33. The computer readable media of claim 22, wherein the desired investment objective is maximizing the worst case ratio of the expected excess return to the standard deviation of the asset return and wherein the investment problem takes the form of a robust maximum Sharpe ratio portfolio selection program.

34. The computer readable media of claim 33, wherein the robust maximum Sharpe ratio portfolio selection program is solved using a second order cone program.

35. The computer readable media of claim 22, wherein the investment problem takes the form of a robust value at risk portfolio selection program.

36. The computer readable media of claim 35, wherein the robust value at risk portfolio selection program is solved using a second order cone program.

37. The computer readable media of claim 22, wherein the investment problem is one that is user selected from the group including a robust minimum variance portfolio selection program, a robust maximum return portfolio selection program, a robust maximum Sharpe ratio portfolio selection program and a robust value at risk portfolio selection program.

38. The computer readable media of claim 37, wherein the selected investment problem is solved using a second order cone program.

* * * * *